(12) United States Patent
Kim

(10) Patent No.: US 7,359,346 B2
(45) Date of Patent: Apr. 15, 2008

(54) APPARATUS FOR CONTROLLING DATA TRANSMISSION/RECEPTION BETWEEN MAIN SYSTEM AND REMOTE SYSTEM OF BTS IN MOBILE COMMUNICATION SYSTEM

(75) Inventor: Kyou-Seung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1030 days.

(21) Appl. No.: 10/392,872

(22) Filed: Mar. 21, 2003

(65) Prior Publication Data
US 2003/0179779 A1    Sep. 25, 2003

(30) Foreign Application Priority Data
Mar. 21, 2002   (KR) ............... 10-2002-0015288

(51) Int. Cl.
*H04B 7/212* (2006.01)
(52) U.S. Cl. ............ 370/324; 370/350; 370/466; 370/509
(58) Field of Classification Search ............ 370/395.1, 370/465, 466, 907, 324, 350, 331, 503, 506, 370/509, 510; 455/502, 561, 560; 398/128, 398/129, 130, 131, 154
See application file for complete search history.

(56) References Cited

U.S. PATENT DOCUMENTS

2001/0002863 A1*   6/2001   Yoshiyama ............... 359/124
2001/0024430 A1*   9/2001   Sekine et al. ............ 370/331

\* cited by examiner

*Primary Examiner*—Doris H. To
*Assistant Examiner*—Ian N. Moore
(74) *Attorney, Agent, or Firm*—Roylance, Abrams, Berdo & Goodman, L.L.P.

(57) ABSTRACT

An apparatus for controlling data transmission/reception between a main system and a remote system of a base transceiver station (BTS) in a mobile communication system to improve reliability of data without the limitation of signal transmission distance between a main system and a remote system. The apparatus has: a time stamp generator for generating a time stamp signal indicating start of a Synchronous Transfer Mode STM) frame using a reference synchronous signal; a data former for receiving and being synchronized with the reference synchronous signal, and converting received traffic data into STM frame data; and a data transmitter for receiving and mapping the output data of the time stamp generator with a data communication channel (DCC), receiving output data of the data former, mapping the output data of the data former with a frame transmission channel, converting data mapped with the channels into an optical signal for transmission on an optical path.

10 Claims, 4 Drawing Sheets

APPARATUS FOR CONTROLLING DATA TRANSMISSION/RECEPTION BETWEEN MAIN SYSTEM AND REMOTE SYSTEM OF BTS IN MOBILE COMMUNICATION SYSTEM

PRIORITY

This application claims priority under 35 U.S.C. § 119 to an application entitled "Apparatus For Controlling Data Transmission/Reception Between Main System And Remote System Of BTS In Mobile Communication System", filed in the Korean Industrial Property Office on Mar. 21, 2002 and assigned Ser. No. 2002-15288, the contents of which are hereby incorporated by reference.

BACKGROUND OF THE INVENTION

1. Field of the Invention

The present invention relates to a data transmission/reception apparatus for a Base Transceiver Station (BTS) in a mobile communication system, and more particularly to a data transmission/reception apparatus for a BTS system composed of a main system and a remote system.

2. Description of the Related Art

Typically, a mobile communication system is composed of a plurality of Base Station Controllers (BSCs) connected to a lower layer of a Mobile Switching Center (MSC) and a plurality of BTSs connected to a lower layer of the BSCs. The BTSs establish data transmission/reception with mobile terminals via RF channels. Since the BTSs are connected to the mobile terminals via RF channels, the signal transmission distance of the RF channel between the BTSs and the mobile terminals is an important factor when determining the cell areas of the BTSs. Another factor is the number of subscribers contained in one BTS, among a variety of factors to determine cell areas of the BTSs. Therefore, a cell area of the BTS of an urban district is different from that of a rural district. More specifically, a signal transmission distance is very short in the case where the buildings are closely situated together in a given area such as an urban district, resulting in a small cell area of the BTS in the urban district. Moreover, the number of subscribers in urban districts increases more and more, such that a cell area of the BTS becomes smaller and smaller. On the other hand, in the case where there are a small number of subscribers and few obstacles in a given area such as a rural district, a cell area of the BTS becomes wider.

However, in the case where the BTSs are installed by considering only a transmission distance of signals transmitted from the BTSs, even though there are few subscribers in a given area, there may be underutilization of BTS resources. Otherwise, in the case where a signal transmission distance from the BTSs becomes shorter because the channel environment is excessively deteriorated, even though there are a great number of subscribers in a given area, the BTS resources may be inefficiently used in light of the number of subscribers contained in each BTS. As described above, underutilization of BTS resources may occur due to a variety of environmental factors, such that it is necessary to solve this inefficiency.

To prevent the underutilization of the BTS resources, there has been proposed an architecture wherein a BTS system is divided into a main system and a remote system to increase its own cell area. A main system and a remote system of the BTS system will hereinafter be described with reference to FIGS. 1 and 2.

Figure 1:
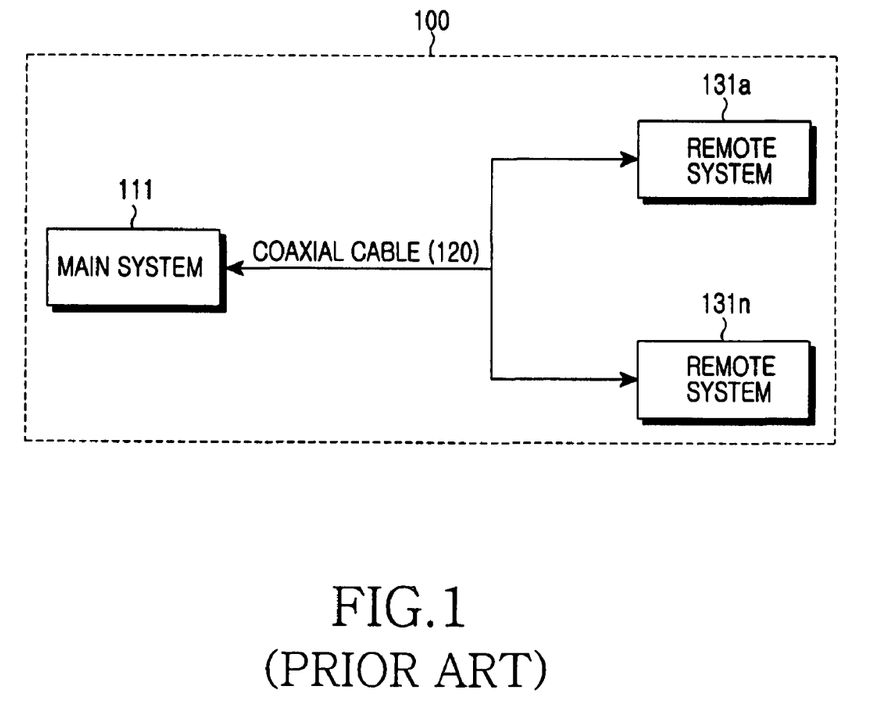
FIG. 1 is a block diagram illustrating the coupling between a main system and a remote system of a conventional BTS over a coaxial cable.

FIG. 1 is a view illustrating the coupling between a main system and a remote system of a BTS through a coaxial cable. Referring to FIG. 1, the BTS 100 includes a main system 111 and a plurality of remote systems 131-a to 131-n. The main system 111 is connected to the plurality of remote systems 131-a to 131-n through a coaxial cable 120, that is, the main system 111 is connected to more than one remote system. In the case of using the coaxial cable 120, the remote systems 131-a to 131-n are adapted to separate an RF block (e.g., an RF transceiver) from the main system 111. The remote systems 131-a to 131-n and the main system 111 are interconnected over the coaxial cable 120, such that the system configuration shown in FIG. 1 can be applicable to a conventional system without changing the internal configuration of the conventional system. However, the coaxial cable 120 is subject to significantly more signal leakage than an optical cable, such that there may also be leakage of data. Further, the distance between the main system 111 and the remote system 131-a, . . . , or 131-n is limited. Therefore, in order to solve the limitation in distance between the main system 111 and the remote system 131, there has been proposed another architecture for connecting such a main system with a remote system through an optical path, as shown in FIG. 2.

Figure 2:
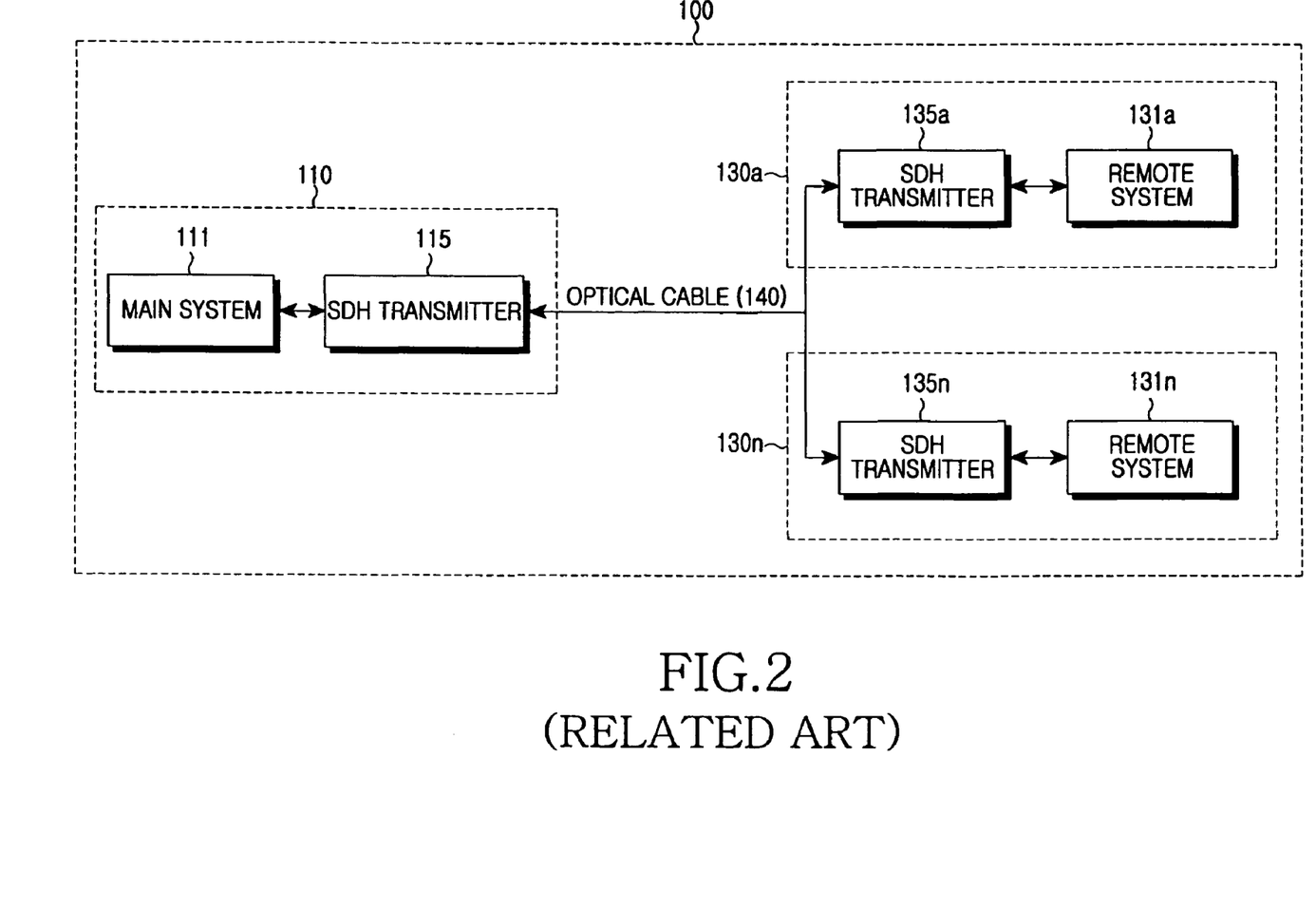
FIG. 2 is a block diagram illustrating the coupling between a main system and a remote system of a conventional BTS through an optical cable.

FIG. 2 is a view illustrating a block diagram of a system for connecting a main system and a remote system through an optical cable. With reference to FIG. 2, an optical cable 140 is adapted as a transmission path. The main system 110 includes a main module 111 and a Synchronous Digital Hierarchy (SDH) transmitter 115 interfaced with the optical cable 140. In more detail, the main system 110 performs the same function as in FIG. 1, but further includes a SDH transmitter 115. The remote system 130 includes a plurality of remote systems 130-a to 130-n. Each remote system 130-a, . . . , or 130-n includes a SDH transmitter 135-a, . . . , or 135-n and a remote module 131-a, . . . , or 131-n. The SDH transmitter 135 interfaces with data transmitted from the main system 110 via optical signals. The remote system 130 is the same as that of FIG. 1, but further includes a SDH transmitter 135.

The SDH transmitter 135 of the remote system 130 is identical with the SDH transmitter 115 of the main system 110. In the case of transmitting data over the SDH transmitters 115 and 135, the SDH transmitters 115 and 135 perform data conversion in the form of SDH, and modulate the converted data onto an optical signal. In the case of receiving data over the SDH transmitters 115 and 135, the SDH transmitters 115 and 135 convert the optical signal into an electric signal, demodulate the electric signal in the form of SDH, and transmit the demodulated signal to the main system 111 and remote module 131, respectively.

Referring to FIG. 2, the SDH transmitters 115 and 135 perform data conversion in the form of SDH, and either convert an optical signal into an electric signal or convert the electric signal into the optical signal, and thereby increase the data transmission distance and the cell area of the BTS. The BTS 100 should be in synchronization with all of the data at the same time, but it may not be actually so even though system synchronization is established among a plurality of remote modules. More specifically, in the case of transmitting data from the main system 110 to the remote system 130-a, . . . , or 130-n, it is necessary for the main system 110 to execute data transmission to the remote systems 130-a to 130-n at the same time. The BTS must execute a specified function such as a handover function because a plurality of mobile terminals of the BTS can freely move anywhere, such that a call transfer should also be completed at the same time that the handover function is executed. Therefore, in the case where any BTS does not effectively perform such a handover function, there may occur a loss of traffic data.

The data transmitted over the SDH transmitters is defined as the Synchronous Transfer Mode (STM-n) frame data. The aforementioned systems need to accurately detect individual positions of the STM-n frames in order to detect payload data. In more detail, in the case of using only the above SDH transmitters without any other applications, synchronization for executing a real handover among a plurality of systems may not be normally established even though synchronization condition is established among the systems. In addition, it is impossible for the STM-n frame data to restore data in either the main system 111 or the remote modules 131-*a* to 131-*n*.

SUMMARY OF THE INVENTION

Therefore, the present invention overcomes the above-described problems and realizes a number of advantages over existing architectures. It is an object of the present invention to provide a data transmission/reception apparatus for guaranteeing the reliability of data without the limitation of a signal transmission distance between a main system and a remote system of a BTS in a mobile communication system.

It is another object of the present invention to provide a data transmission/reception apparatus for compensating the delay of data between a main system and a remote system of a BTS in a mobile communication system.

It is yet another object of the present invention to provide a data transmission/reception apparatus for executing data encryption between a main system and a remote system of a BTS in a mobile communication system, thereby guaranteeing data security between them.

In accordance with one aspect of the present invention, the above and other objects can be accomplished by an apparatus for transmitting data in a Base Transceiver Station (BTS) containing a main module and a remote module, each having a digital hierarchy transmission/reception unit, the apparatus comprising: a time stamp generator for generating a time stamp signal indicative of a start position of a STM frame using a reference synchronous signal for use in a mobile communication system; a data former for receiving the reference synchronous signal, being synchronized with the reference synchronous signal, and converting received traffic data of the mobile communication system into STM frame data; and a data transmitter for receiving the output data of the time stamp generator, mapping the output data of the time stamp generator with a data communication channel (DCC), receiving output data of the data former, mapping the output data of the data former with a frame transmission channel, converting data mapped with the channels into an optical signal, and transmitting the optical signal to an optical path.

Preferably, the data former comprises: a reference signal provider for receiving the reference synchronous signal, and generating a reference signal; a traffic data interface for receiving serial traffic data of the mobile communication system and the reference signal, being synchronized with the reference synchronous signal, and converting the serial traffic data into parallel traffic data; an overhead processor for generating overhead data used for maintenance of a STM signal; and a frame processor for receiving the parallel traffic data of the mobile communication system, the reference synchronous signal, and the overhead data, being synchronized with the reference synchronous signal, and generating STM frame data using the overhead data and the traffic data.

Preferably, the data former may further comprises a scrambling processor for receiving the frame data from the frame processor, and scrambling all of the signals except a frame alignment signal.

In accordance with another aspect of the present invention, there is provided an apparatus for receiving data at a digital hierarchy in a Base Transceiver Station (BTS) containing a main module and a remote module, each having a digital hierarchy transmission/reception unit, the apparatus comprising: a data receiver for receiving a STM optical signal, converting the STM optical signal into an electric signal, and generating a signal (i.e., DCC signal) received over a Data Communication Channel (DCC) separately from a signal (i.e., frame transmission channel signal) received over a frame transmission channel; a time stamp restoration module for receiving the DCC signal and the frame transmission channel signal from the data receiver, detecting a time stamp signal adapted to execute frame restoration, and generating a restored time stamp signal; and a data restoration module for receiving the frame transmission channel signal and the restored time stamp signal, and restoring the frame transmission channel signal according to the restored time stamp signal.

Preferably, the data restoration module comprises: a frame processor for receiving a reference signal, received frame data, and a time stamp signal, dividing a frame into a plurality of frame units according to the time stamp signal, separating overhead from traffic data in the divided frames, and outputting the overhead and the traffic data according to the reference signal; an overhead processor for receiving the overhead data, obtaining maintenance information, and outputting the maintenance information; a traffic data interface for converting the traffic data into serial data according to the reference signal; and a reference signal provider for receiving a reference synchronous signal to create the reference signal, and outputting the reference signal.

Preferably, the data restoration module may further comprises a scrambling processor for descrambling reception frame data having been scrambled, and outputting the descrambled frame data to the frame processor.

Preferably, the time stamp restoration module comprises: a frequency divider for executing frequency division on a STM clock signal, and generating frequency-divided signals; a serial/parallel converter for receiving the serial frame data according to the STM clock signal, being synchronized with a signal received from the frequency divider, and converting the serial frame data into parallel frame data; a delay for delaying the parallel frame data by a predetermined clock signal; a register for sequentially storing parallel frame data delayed by the delay and non-delayed parallel frame data, and outputting them according to a First Input First Output (FIFO) scheme; a pattern detector for detecting a pattern of a frame alignment signal (FAS) from among output frame data of the register, outputting the detected pattern, and sequentially outputting input data; and an output signal detector for receiving the frame data and a pattern detection signal, and outputting the frame data according to the pattern detection signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will now be described in detail with reference to the annexed drawings. In the drawings, the same or similar elements are denoted by the same reference numerals even though they are depicted in different drawings.

A synchronous transfer mode (STM) system in accordance with the present invention will hereinafter be described below in connection with FIGS. 3-5. The STM system preferably uses a SDH. The SDH makes it possible to construct a network architecture using a plurality of optical communication systems, and is defined as a data transmission scheme adapted as a NNI (Network-to-Network Interface) standard for a B-ISDN (Broadband ISDN).

Because the SDH uses a basic signal composed of STM-n signals (i.e., 155.520 Mbps×n) and the STM-n signals are multiplexed at predetermined intervals of 125 μs, this signal transmission mode is defined as a synchronous transfer mode. In the STM-n signals, n is an integer, for example, 1, 4, 16, . . . The term 'STM-n' will be described in further detail below.

The STM system uses a synchronous multiplexing structure, resulting in multiplexing/demultiplexing. In addition, the STM system can improve an operation and maintenance (O&M) function using overhead, and can upgrade a system or network to a high-speed system or network.

The above STM-n frame will now be described in more detail. The STM-n signal functions as a basic signal for a SDH. The STM-n frame structure is prescribed in the standard ITU-T G.709. The frames based on the ITU-T G.709 are repeated at intervals of 125 μs. Each frame is composed of 9 rows and 270 bytes for every row. The STM-n frame structure has the configuration shown in the following Table 1.

TABLE 1

| A1 | A1 | A1 | A2 | A2 | A2 | C1 | NU | NU | |
|----|----|----|----|----|----|----|----|----|----|
| B1 |    |    | E1 |    |    | F1 |    |    | P |
| D1 |    |    | D2 |    |    | D3 |    |    | O |
|    |    |    | AU-4 POINTER | | | | | | H | Payload |
| B2(BIP-24) | | | K1 | | | K2 | | | |
| D4 |    |    | D5 |    |    | D6 |    |    | |
| D7 |    |    | D8 |    |    | D9 |    |    | |
| D10 |   |    | D11 |   |    | D12 |   |    | |
| S1 |    |    | M1 |    |    | E2 |    |    | |

Table 1 depicts the configuration of the STM-n frame based on the ITU-T G.709 standard. Individual bytes of the STM-n frame in Table 1 are shown in the following Table 2.

TABLE 2

| Signal | Section Class | Description |
|--------|---------------|-------------|
| A1, A2 | RSOH | Frame Alignment Code |
| B1 | RSOH | Regenerator Section Parity Check |
| B2 | MSOH | Multiplex Section Parity Check |
| B3 | POH | Path Section Parity Check |
| C1 | SOH | Signal Number |
| C2 | POH | Signal Number |
| D1~D12 | SOH | Data Communication Channel |
| E1, E2 | RSOH + MSOH | Order Wire |
| F1, F2 | RSOH + POH | User Channel |
| G1 | POH | Path State Check |
| H4 | POH | Multiframe Display |
| J1 | POH | Path Tracing |
| K1, K2 | MSOH | Automatic Protection Switching (APS) |
| Z1~Z5 | MSOH | Redundant Overhead |

The STM-n signal configured in the form of frame has a bit rate as denoted by the following Equation 1:

$$\text{Bit rate} = \text{Frame Rate} \times \text{Frame Capacity} \qquad (1)$$

As shown in the above Equation 1, a frame rate is 8000 Frames/Second (=125 μs), and a frame capacity is denoted by 270 Bytes/Row×9 Row/Frame×8 Bits/Byte×n. In brief, the frame capacity is expressed as 19,440×n Bits/Frame, resulting in a bit rate=8000 Frames/Second×19,440 Bits/Frame×n. Therefore, a bit rate of 155.520×n Mbps is obtained using the above Equation 1.

An overhead contained in the STM-n signal is classified into an RSOH (Regeneration Section OverHead), a MSOH (Multiplex Section OverHead), and a POH (Path OverHead). These overheads will now be described in further detail.

The RSOH is adapted when a regenerator is connected between terminations points. In more detail, the RSOH serves as an overhead used for guaranteeing the reliability of data transmission between the termination point and the regenerator, and uses many bytes ranging from the first to ninth columns in the first to third rows of the STM-n frame. For example, a frame alignment byte, a performance monitoring byte, and a data communication channel #1 (i.e., DCC 1) byte, etc., can be adapted as the RSOH.

The MSOH is adapted to guarantee the reliability of data transmission between terminations points other than a regenerator. In more detail, the MSOH uses many bytes ranging from the first to ninth columns in the fifth to ninth rows of the STM-n frame. For example, a performance monitoring byte, a data communication channel #2 (i.e., DCC 2) byte, or a remote alarm monitoring byte, etc., can be adapted as the MSOH.

The POH is adapted to monitor performance for every channel while checking channel continuity until hierarchy signals for every channel are synchronized with a STM-1 signal and then multiplexed. The POH is also adapted to monitor remote sites for every channel. For example, a channel performance monitoring byte, a channel continuity check byte, or a remote monitoring byte for every channel, etc., can be adapted as the POH.

In the case where a BTS 100 is composed of a main system 111 and remote systems 131-a to 131-n, as illustrated in FIG. 2, a detailed diagram of a SDH transmitter 300 (FIG. 3) constructed in accordance with the present invention and its operation will hereinafter be described in detail. The SDH transmitter 300 is preferably substituted for the conventional SDH transmitter 115 or 135, which are identical as stated above. More specifically, provided that a BTS is configured as shown in FIG. 2, individual function blocks for establishing a handover function and other functions, in the BTS in accordance with the present invention will hereinafter be described in detail in connection with FIGS. 4 and 5.

Figure 3:
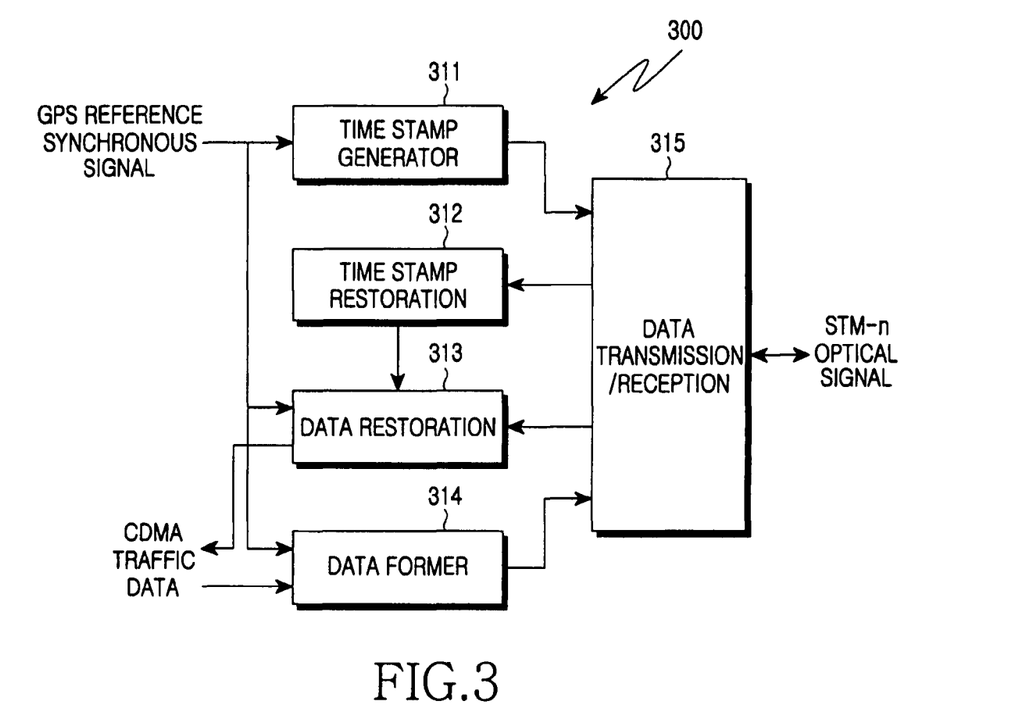
FIG. 3 is a block diagram illustrating a SDH transmitter in accordance with a preferred embodiment of the present invention.

FIG. 3 is a block diagram illustrating a SDH transmitter 300 in accordance with a preferred embodiment of the present invention. Individual blocks of the SDH transmitter and their function will hereinafter be described with reference to FIG. 3. Referring to FIG. 3, the SDH transmitter 300 is connected to a main system 111 of the BTS 100 and can be substituted for the SDH transmitter 115 or 135 in FIG. 2.

The time stamp generator 311 receives a GPS reference synchronous signal from the main system 111. The GPS reference synchronous signal is generally received at a BTS system to establish synchronization between BTSs, such that its detailed description will herein be omitted. The time stamp generator 311 receives a GPS reference synchronous signal, and generates a time stamp signal. The time stamp signal is transmitted to a data transmission/reception module 315, and is transmitted over a data communications channel (DCC) of a STM-n frame in the data transmission/reception module 315. The time stamp signal indicates a start position of the STM frame, and provides the same time delay among a plurality of data transmitted while being classified according to individual distances between the main system and each of the remote systems 131-$a$ to 131-$n$. A reception end receives the data, and is then synchronized with the data.

The time stamp generator 311 is preferably provided only in the SDH transmitter 115 connected to the main system 11 of the BTS 100. A time stamp restoration module 312 may be contained in the SDH transmitter 115 connected to the main system 111, or may be connected to the SDH transmitters 135-$a$ to 135-$n$ respectively connected to the remote systems 131-$a$ to 131-$n$. FIG. 3 is an exemplary configuration for the convenience of description and better understanding of the aforementioned components. The time stamp restoration module 312 detects a time stamp from signal received from the data transmission/reception module 315, and transmits it to a data restoration module 313. The time stamp signal is transmitted to the remote systems 131-$a$ to 131-$n$ respectively connected to the SDH transmitters 135-$a$ to 135-$n$. The time stamp restoration module 312 will be described later with reference to FIG. 5.

The data restoration module 313 receives a STM-n signal from the data transmission/reception module 315, restores the STM-n signal according to the time stamp signal received from the time stamp restoration module 312, and transmits the restored data to the main system 111. In this case, the restored data is CDMA traffic data. The data restoration module 313 will also be described later with reference to FIG. 5.

A data former 314 converts data to be transmitted into STM-n data according to a SDH transmission scheme, and transmits the STM-n data to the data transmission/reception module 315. In more detail, the data to be transmitted is converted into frame data in the form of the above Table 2, and the frame data in the form of the Table 2 is transmitted to the data transmission/reception module 315.

The data transmission/reception module 315 converts the frame data into STM-n optical signal, and transmits the STM-n optical signal to the SDH transmitters 135-$a$ to 135-$n$ respectively connected to the remote systems 131-$a$ to 131-$n$. The data transmission/reception module 315 converts the STM-n optical signals received from the SDH transmitters 135-$a$ to 135-$n$ respectively connected to the remote systems 131-$a$ to 131-$n$ into electric signals, and transmits the electric signals to the data restoration module 313 and the time stamp restoration module 312.

For the convenience of description and better understanding of the present invention, a data restoration module 313 and a data former 314 are shown separately from each other. However, since data restoration is preferably actually established in the data former 314, the data restoration module 313 may be configured to find only a position of a frame signal. In more detail, the data former 314 executes data restoration through a reverse process of a data formation process of the data former 314. The data restoration module 313 may be designed to extract only both a start position of reception frame data and a payload position, and will be described with reference to FIGS. 4 and 5.

Figure 4:
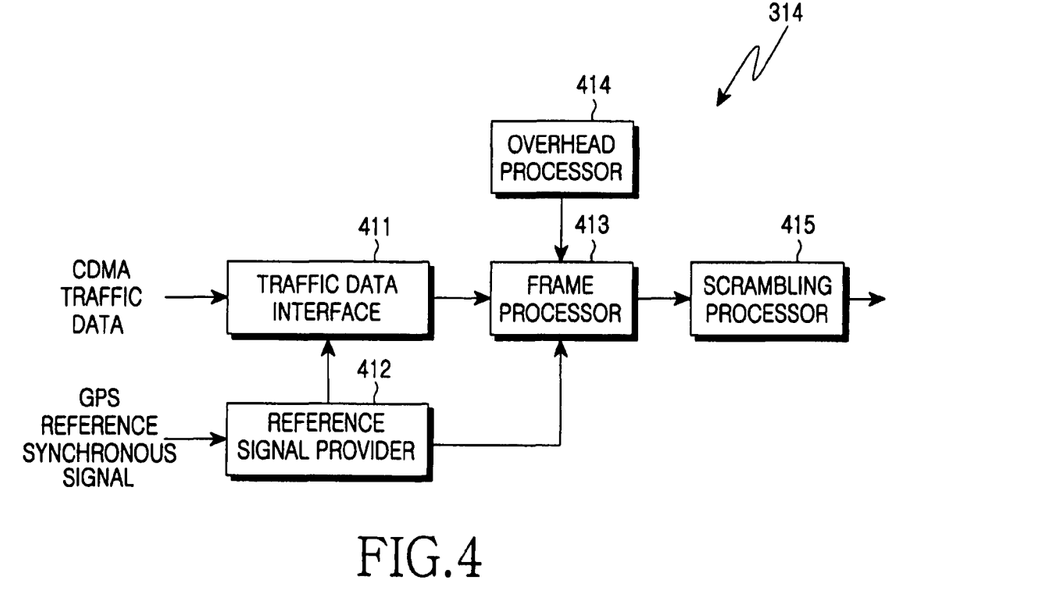
FIG. 4 is a block diagram illustrating a data former for generating STM-n signals according to a SDH scheme in accordance with a preferred embodiment of the present invention.

FIG. 4 is a block diagram illustrating the data former 314 for generating STM-n signals according to a SDH scheme in accordance with a preferred embodiment of the present invention. The data former 314 and its operation will hereinafter be described with reference to FIG. 4. The data former 314 re-extracts data and outputs it. In the case of extracting the data in the data former 314, the traffic data is extracted through a reverse process of the following process, such that the description of the data extraction process will herein be omitted.

Referring to FIG. 4, CDMA traffic data being transmitted/received in a mobile communication system is outputted from the main system 111 of the BTS 100, and then transmitted to a traffic data interface 411. In this case, the output data of the main system 111 is parallel data, such that a traffic data interface 411 receives the input data using a 8×n-sized FIFO buffer (not shown in FIG. 4).

In the case of establishing data mapping with the FIFO buffer, the direction from the main system 111 to the remote system 131 is called a forward direction. The following matters should be firstly clarified to understand this forward mapping.

Firstly, the main system 111 generates all the timings on the basis of a BTS reference synchronous signal of a GPS. Secondly, the remote system 131 generates all the timings on the basis of a signal of 1.6 KHz. Thirdly, the size of the FIFO buffer is set to M×(8+1), and read/write addresses are initiated by their individual reference signals at the same time. Fourthly, when the FIFO address is initiated, a difference between the read and write addresses is an interval of M/2 address. Fifthly, an interval between STM-n data and CDMA traffic chip data is 1.6 KHz (=5 Frame; integer multiple of 8 KHz).

Considering the aforementioned matters, the FIFO buffer is preferably designed to compensate the difference between a transfer rate of the STM-n data and a transfer rate of the CDMA traffic data, to have an optimal size by which a loss of data is prevented, and to determine a stuffing position according to the optimal size. As shown in the STM-n frame of the Table 1, a basic stuffing position is determined on the basis of 9 rows contained in a range of 125 μs, and the remaining stuffing positions are determined at intervals of 625 μs. The basic stuffing generates one-clock stuffing signals for every P number of STM clocks (19.44 MHz×n). An overhead position in the STM-n frame allows given position to directly cause a stuffing. For example, if the stuffing occurs in the STM-1 frame, the result is represented as the following Table 3.

TABLE 3

| Frame Number | Number of Stuffings for SOH + POH | Number of Fix #1 stuffings (every P = 5) | Number of Fix #2 stuffings (Channel Stuff Point) | Number of Fix #3 stuffings (Sub-frame Stuff Point) | Total |
|---|---|---|---|---|---|
| 1 | 90 | 468 | 27 | 2 | 587 |
| 2 | 90 | 468 | 27 | 2 | 587 |
| 3 | 90 | 468 | 27 | 2 | 587 |
| 4 | 90 | 468 | 27 | 2 | 587 |
| 5 | 90 | 468 | 27 | 1 | 587 |
| Total | 450 | 2340 | 135 | 9 | 2934 |

19.4 MHz × Byte − 14.7456 MHz × Byte = 4.6944 MHz × Byte
(=586.8 Bytes/Frame = 2943 Bytes/5 Frames)

The Table 3 depicts the STM-1 frame parallel data format (i.e., 19.44 MHz×n Bytes) and parallel data changed in units of CDMA traffic data clock (i.e., traffic chip clock)×m/2 (i.e., 14.7456 MHz), wherein the CDMA traffic data clock takes an integer multiple of a BTS reference clock (i.e., 1.2288 MHz×24).

Therefore, in order to consistently restore data transmitted to the FIFO buffer of the remote system 131 at the same position, the following matters are solved. Firstly, a frame restoration module guarantees a predetermined phase by which a pulse of 1.6 KHz is retimed at a clock rising edge of a CDMA traffic data clock (i.e., traffic chip clock)×m/2×n (where, m and n are integers). Secondly, payload data of the STM-n frame and a pulse of 1.6 KHz indicative of a payload start position are written in the FIFO buffer or read therefrom.

Provided that the aforementioned matters are satisfied, the remote systems 131-a to 131-n essentially always indicate the signal of 1.6 KHz indicative of the payload start position at the same position on the basis of a BTS reference synchronous signal of the main system 111, irrespective of power on/off timing points among the main system 111 and the remote systems 131-a to 131-n.

The traffic data interface 411 outputs input data in payload area units of the STM-n frame, and is mapped with a frame. The traffic data interface 411 extracts payload data from among a plurality of data contained in a frame, and outputs it.

A reference signal provider 412 receives a GPS reference synchronous signal from the main system 11 of the BTS 100, and generates a reference signal. In more detail, the reference signal provider 412 calculates a start position of the STM-n frame and a start position of payload data in a transmission signal, and inserts the calculated start positions into an AU-4 pointer position. Therefore, a reception end can find the payload start position of the received STM-n frame data using the pointer. A reference signal generated from the reference signal provider 412 is transmitted to a data interface 411 and a frame processor 413.

The traffic data interface 411 transmits to the frame processor 413 payload data to be outputted according to the reference signal received from the reference signal provider 412.

The overhead processor 414 generates overhead data used for maintenance of the STM-n signal, and outputs them to the frame processor 413. The overhead data is created in the form of the Table 1. Therefore, the reception end extracts received overhead data from among the STM-n frame data, and thereby determines whether a transmission error or failure occurred.

Upon receiving overhead data from the overhead processor 414, data from the traffic data interface 411, and data from the reference signal provider 412, the frame processor 413 creates complete overhead data for the STM-n frame data. That is, an AU-4 pointer received from the reference signal provider 412 is inserted into the overhead data received from the overhead processor 414. The combined overhead data is inserted at intervals of 8 KHz. The CDMA traffic data received from the traffic data interface 411 is inserted into the payload area of the frame in order to create frame data. The data created by the frame processor 413 is then applied to a scrambling processor 415.

The scrambling processor 415 scrambles all of the data other than a STM-n frame alignment signal in order to facilitate line interference and clock restoration on a transmission path of the transmission STM-n signal, and then outputs the scrambled results. Therefore, the reception end firstly descrambles an input signal, and restores it.

The aforementioned description of FIG. 4 is provided on the assumption that a data transmission is established. However, in the case of restoring reception data, the scrambling processor 415 descrambles the reception frame data and outputs the descrambled result to the frame processor 413. The frame processor 413 separates the overhead from the CDMA traffic data according to a frame start position and a payload position received from the data restoration module 313 to be described later. The overhead separated from the frame processor 413 is transmitted to the overhead processor 414, and the CDMA traffic data is transmitted to the traffic data interface 411. Therefore, the overhead processor 414 checks the type of received overhead data and any error of reception data, and outputs a resultant signal to the main system 111. In addition, the traffic data interface 411 stores the received data in a buffer, converts the received data into 8-bit parallel data, and outputs the 8-bit parallel data to the main system 111. In this way, data restoration is established.

The SDH transmitter 300 connected to the main system 111 of the BTS which is in lieu of a conventional SDH transmitter 115, has been disclosed in the above preferred embodiment. This embodiment can be applied to the SDH transmitters 135-a to 135-n, respectively, connected to the remote systems 131-a to 131-n in the same manner as the above. However, in this case, the signal applied to the reference signal provider 412 is preferably a reference clock extracted from the frame data, instead of a GPS reference signal.

Figure 5:
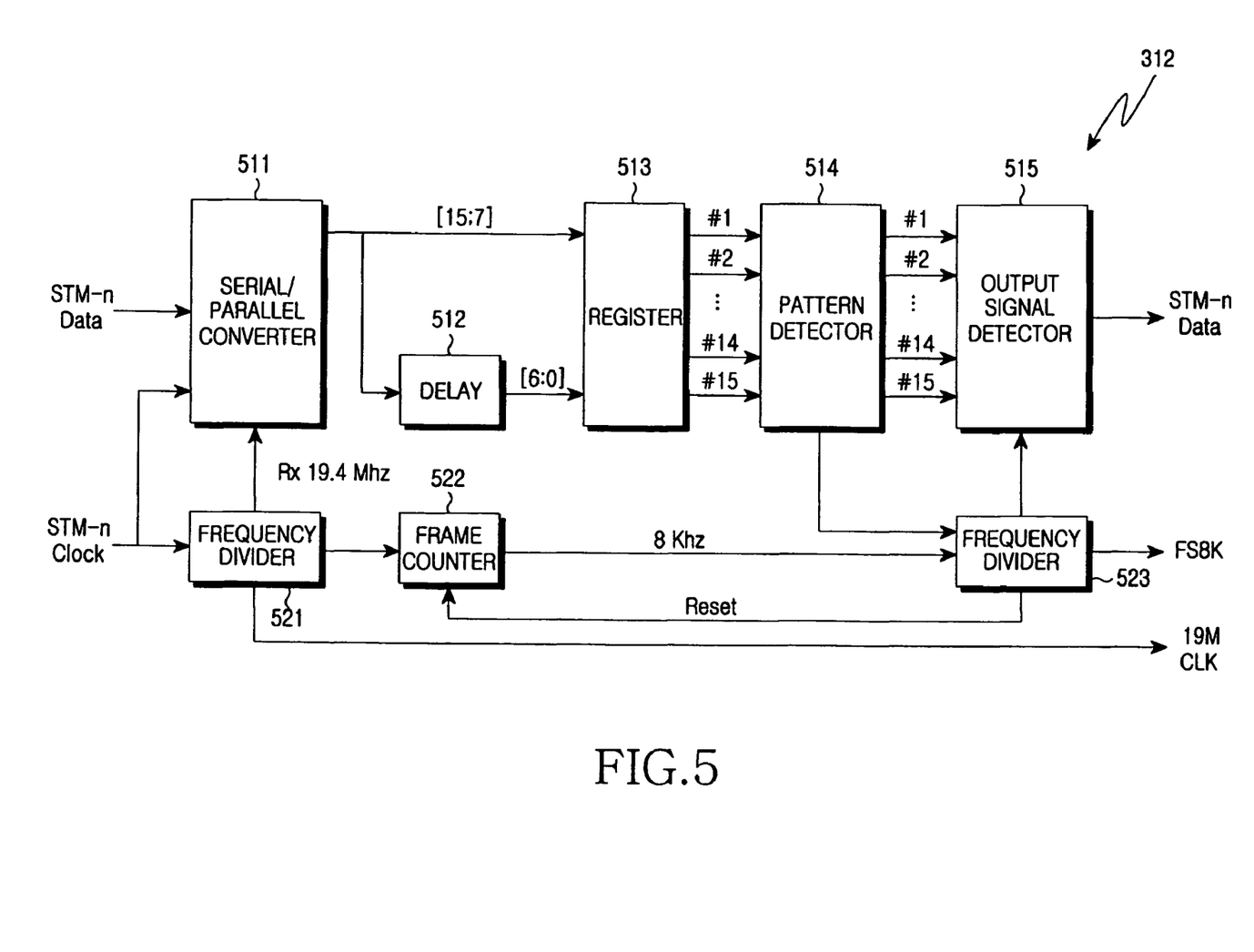
FIG. 5 is a detailed block diagram illustrating a time stamp restoration module shown in FIG. 3 in accordance with a preferred embodiment of the present invention.

FIG. 5 is a detailed block diagram illustrating the time stamp restoration module 312 shown in FIG. 3 in accordance with a preferred embodiment of the present invention. Blocks for detecting a start position of a reception frame in the data restoration module 313 and the time stamp restoration module 312, a data restoration procedure using the blocks, and a detailed description of the blocks will hereinafter be described with reference to FIG. 5.

Referring to FIG. 5, serial STM-n data transmitted from the data transmission/reception module 315 to a serial/parallel converter 511 is a signal of 155.520 MHz×n (where n is an integer). Therefore, the serial/parallel converter 511 receives a STM-n reference clock signal for processing the serial input signal. The STM-n reference clock is applied to a frequency divider 521. The frequency divider 521 performs frequency division on the received signal to create a signal of 19.44 MHz, and outputs the signal of 19.44 MHz to the serial/parallel converter 511 and the frame counter 522. In more detail, the frequency divider 521 generates a clock signal used for converting the serial input data into 8-bit parallel data according to the signal of 19.44 MHz.

The serial/parallel converter 511 converts the input serial data into 8-bit parallel data, and outputs the results to a register 513 and a delay 512. Therefore, the serial/parallel converter 511 has a FIFO structure, and can be configured as a buffer for converting serial data into parallel data.

The delay 512 delays an input signal by a predetermined time, and outputs the results to a register 513. More specifically, the delay 512 delays the input signal by one clock cycle or more than one clock cycle, and outputs the results to the register 513 according to a received data clock. Therefore, the register 513 transmits individual output data of the serial/parallel converter 511 and the delay 512 to a pattern detector 514. The register 513 is designed to store both 8-bit data received from the serial/parallel converter 511 and the output data of the delay 512.

The pattern detector 514 detects a pattern for executing frame synchronization on the basis of reception signals. That is, the pattern detector 514 finds a frame alignment signal (FAS) to detect a frame start position. The FAS can be configured as prescribed successive bits detected at intervals of 8 KHz. For example, a signal of F6F6F6282828 based on a hexadecimal notation can be adapted as a FAS pattern indicative of a frame start position. Then, the pattern detector 514 detects a multi-frame pattern being repeated between the CDMA traffic data frame and the STM data frame at intervals of 1.6 KHz, such that a pulse of 1.6 KHz needed to find a payload at the same position can be created.

In the case where the pattern detector 514 generates the FAS and the clock signal for detecting the payload, it transmits the FAS and the clock signal to a frequency divider 523, and transmits the received data to an output signal detector 515 according to the detected pattern. Therefore, the output signal detector 515 outputs the received frame data in regular sequence. This frame data is applied to the data restoration module 313 of FIG. 3, resulting in the execution of data restoration.

As apparent from the above description, a data transmission/reception apparatus according to the present invention guarantees the reliability of data without the limitation of a signal transmission distance between a main system and a remote system of a BTS in a mobile communication system, guarantees data security between them, and easily decodes desired data according to signal synchronization.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for transmitting data in a Base Transceiver Station (BTS) containing a main module and a remote module, each having a digital hierarchy transmission/reception unit, the apparatus comprising:
    a time stamp generator for generating a time stamp signal indicative of a start position of a Synchronous Transfer Mode (STM) frame using a reference synchronous signal for use in a mobile communication system;
    a data former for receiving the reference synchronous signal, being synchronized with the reference synchronous signal, and converting received traffic data of the mobile communication system into STM frame data; and
    a data transmitter for receiving an output data of the time stamp generator, mapping the output data of the time stamp generator with a data communication channel (DCC), receiving output data of the data former, mapping the output data of the data former with a frame transmission channel, converting each of the output data mapped with the channels into an optical signal, and transmitting the optical signal to an optical path;
    wherein the data former comprises:
    a reference signal provider for receiving the reference synchronous signal, and generating a reference signal;
    a traffic data interface for receiving serial traffic data of the mobile communication system and the reference signal, being synchronized with the reference synchronous signal, and converting the serial traffic data into parallel traffic data;
    an overhead processor for generating overhead data used for maintenance of a STM signal; and
    a frame processor for receiving the parallel traffic data of the mobile communication system, the reference synchronous signal, and the overhead data, being synchronized with the reference synchronous signal, and generating STM frame data using the overhead data and the traffic data.

2. The apparatus as claimed in claim 1, wherein the data former further comprises:
    a scrambling processor for receiving the frame data from the frame processor, and scrambling all of the signals except a frame alignment signal.

3. An apparatus for receiving data in a Base Transceiver Station (BTS) containing a main module and a remote module, each having a digital hierarchy transmission/reception unit, the apparatus comprising:
    a data receiver for receiving a Synchronous Transfer Mode (STM) optical signal, converting the STM optical signal into an electric signal, and generating a signal received over a Data Communication Channel (DCC) separately from the signal received over a frame transmission channel;
    a time stamp restoration module for receiving a DCC signal and the frame transmission channel signal from the data receiver, detecting a time stamp signal to execute frame restoration, and generating a restored time stamp signal; and
    a data restoration module for receiving the frame transmission channel signal and the restored time stamp signal, and restoring the frame transmission channel signal according to the restored time stamp signal;
    wherein the data restoration module comprises:
    a frame processor for receiving a reference signal, received frame data, and the time stamp signal, dividing a frame into a plurality of frame units according to the time stamp signal, separating overhead from traffic data in the divided frames, and outputting the overhead and the traffic data according to the reference signal;
    an overhead processor for receiving the overhead data, obtaining maintenance information, and outputting the maintenance information;
    a traffic data interface for converting the traffic data into serial data according to the reference signal; and
    a reference signal provider for receiving a reference synchronous signal to create the reference signal, and outputting the reference signal.

4. The apparatus as claimed in claim 3, wherein the data restoration module further comprises:
    a scrambling processor for descrambling reception frame data having been scrambled, and outputting the descrambled frame data to the frame processor.

5. An apparatus for receiving data in a Base Transceiver Station (BTS) containing a main module and a remote module, each having a digital hierarchy transmission/reception unit, the apparatus comprising:
- a data receiver for receiving a Synchronous Transfer Mode (STM) optical signal, converting the STM optical signal into an electric signal, and generating a signal received over a Data Communication Channel (DCC) separately from the signal received over a frame transmission channel;
- a time stamp restoration module for receiving a DCC signal and the frame transmission channel signal from the data receiver, detecting a time stamp signal to execute frame restoration, and generating a restored time stamp signal; and
- a data restoration module for receiving the frame transmission channel signal and the restored time stamp signal, and restoring the frame transmission channel signal according to the restored time stamp signal;
- wherein the time stamp restoration module comprises;
- a frequency divider for executing frequency division on a STM clock signal, and generating frequency-divided signals;
- a serial/parallel converter for receiving the serial frame data according to the STM clock signal, being synchronized with the signal received from the frequency divider, and converting the serial frame data into parallel frame data;
- a delay for delaying the parallel frame data by a predetermined clock signal;
- a register for sequentially storing parallel frame data delayed by the delay and non-delayed parallel frame data, and outputting them according to a First Input First Output (FIFO) scheme;
- a pattern detector for detecting a pattern of a frame alignment signal (FAS) from among output frame data of the register, outputting the detected pattern, and sequentially outputting input data; and
- an output signal detector for receiving the frame data and a pattern detection signal, and outputting the frame data according to the pattern detection signal.

6. A method for transmitting data in a Base Transceiver Station (BTS) containing a main module and a remote module, each having a digital hierarchy transmission/reception unit, the method comprising the steps of:
- generating a time stamp signal indicative of a start position of a Synchronous Transfer Mode (STM) frame using a reference synchronous signal for use in a mobile communication system;
- converting received traffic data of the mobile communication system into STM frame data that is synchronized with the reference synchronous signal; and
- mapping the time stamp signal with a data communication channel (DCC);
- mapping the STM frame data with a frame transmission channel; and
- converting each of mapped data in the DCC and frame transmission channel into an optical signal for transmission on an optical path;
- wherein the converting step for converting received traffic data further comprises the steps of:
- generating a reference signal using the reference synchronous signal;
- receiving serial traffic data of the mobile communication system and the reference signal, being synchronized with the reference synchronous signal, and converting the serial traffic data into parallel traffic data;
- generating overhead data used for maintenance of a STM signal; and
- receiving the parallel traffic data of the mobile communication system, the reference synchronous signal, and the overhead data, being synchronized with the reference synchronous signal, and generating STM frame data using the overhead data and the traffic data.

7. A method as claimed in claim 6, further comprising the step of:
- scrambling the frame data except a frame alignment signal.

8. A method for receiving data in a Base Transceiver Station (BTS) containing a main module and a remote module, each having a digital hierarchy transmission/reception unit, the method comprising the steps of:
- receiving a Synchronous Transfer Mode (STM) optical signal;
- converting the STM optical signal into an electric signal and generating a signal received over a Data Communication Channel (DCC) separately from the signal received over a frame transmission channel;
- examining a DCC signal and the frame transmission channel signal to detect a time stamp signal adapted to execute frame restoration and generate a restored time stamp signal; and
- restoring the frame transmission channel signal according to the restored time stamp signal;
- wherein the restoring step further comprises the steps of:
  - generating a reference signal from a reference synchronous signal;
  - receiving the reference signal, received frame data and the time stamp signal and dividing a frame into a plurality of frame units according to the time stamp signal;
  - separating overhead from traffic data in the divided frames and outputting the overhead and the traffic data according to a reference signal;
  - obtaining maintenance information from the overhead; and
  - converting the traffic data into serial data according to the reference signal.

9. A method as claimed in claim 8, wherein the received frame data was scrambled, the restoring step further comprising the step of:
- descrambling the received frame data.

10. A method for receiving data in a Base Transceiver Station (BTS) containing a main module and a remote module, each having a digital hierarchy transmission/reception unit, the method comprising the steps of:
- receiving a Synchronous Transfer Mode (STM) optical signal;
- converting the STM optical signal into an electric signal and generating a signal received over a Data Communication Channel (DCC) separately from the signal received over a frame transmission channel;
- examining a DCC signal and the frame transmission channel signal to detect a time stamp signal adapted to execute frame restoration and generate a restored time stamp signal; and
- restoring the frame transmission channel signal according to the restored time stamp signal;
- wherein the examining further comprises the steps of:
- executing frequency division on a STM clock signal to generate frequency-divided signals;
- receiving the serial frame data according to the STM clock signal, the serial frame data being synchronized with one of the frequency-divided signals, and converting the serial frame data into parallel frame data;

delaying the parallel frame data by a predetermined clock signal;

sequentially storing parallel frame data that has been delayed and non-delayed parallel frame data and outputting them according to a First Input First Output (FIFO) scheme;

detecting a pattern of a frame alignment signal (FAS) from among output frame data resulting from the FIFO scheme, outputting the detected pattern, and sequentially outputting input data; and outputting the frame data according to the pattern detection signal.

* * * * *